United States Patent
Chou et al.

(10) Patent No.: US 9,966,794 B1
(45) Date of Patent: May 8, 2018

(54) POWER SUPPLY FOR REDUNDANT POWER SYSTEM

(71) Applicant: ZIPPY TECHNOLOGY CORP., New Taipei (TW)

(72) Inventors: Chin-Wen Chou, New Taipei (TW);
Yung-Hsin Huang, New Taipei (TW);
Yu-Yuan Chang, New Taipei (TW);
Tzung-Han Lee, New Taipei (TW);
Heng-Chia Chang, New Taipei (TW)

(73) Assignee: ZIPPY TECHNOLOGY CORP., New Taipei (TW)

( * ) Notice: Subject to any disclaimer, the term of this patent is extended or adjusted under 35 U.S.C. 154(b) by 0 days. days.

(21) Appl. No.: 15/685,678

(22) Filed: Aug. 24, 2017

(51) Int. Cl.
*H02J 9/06* (2006.01)
*H02M 1/42* (2007.01)
*H02M 7/02* (2006.01)
*H02M 1/00* (2006.01)

(52) U.S. Cl.
CPC .......... *H02J 9/061* (2013.01); *H02M 1/4258* (2013.01); *H02M 7/02* (2013.01); *H02M 2001/0032* (2013.01)

(58) Field of Classification Search
CPC ...... H02M 1/4258; H02M 7/02; H02M 7/003; H02M 2001/0032; H02J 9/061; G06F 1/188; G06F 1/3293
See application file for complete search history.

(56) References Cited

U.S. PATENT DOCUMENTS

| | | | | |
|---|---|---|---|---|
| 5,460,441 A * | 10/1995 | Hastings | ................. | G06F 1/184 312/138.1 |
| D435,828 S * | 1/2001 | Chou | ........................... | D13/110 |
| D436,075 S * | 1/2001 | Chou | ........................... | D13/110 |
| 6,175,503 B1 * | 1/2001 | Hogan | .................. | H02M 7/003 312/349 |
| 6,304,443 B1 * | 10/2001 | Chou | ....................... | G06F 1/20 361/695 |
| 6,445,586 B1 * | 9/2002 | Chou | ...................... | G06F 1/182 312/223.1 |
| 6,577,501 B2 * | 6/2003 | Lin | ......................... | G06F 1/184 361/679.57 |
| D488,776 S * | 4/2004 | Su | ................................. | D13/110 |
| 6,801,435 B1 * | 10/2004 | Su | ......................... | H05K 7/1432 292/177 |
| 7,099,154 B2 * | 8/2006 | Ishiyama | ................ | G06F 1/184 165/121 |

(Continued)

*Primary Examiner* — Yusef A Ahmed
(74) *Attorney, Agent, or Firm* — Muncy, Geissler, Olds & Lowe, P.C.

(57) ABSTRACT

A power supply for a redundant power system includes a housing, a first circuit board, a second circuit board and a cooling fan. The first and second circuit boards are sequentially disposed in the housing. The length of the first circuit board is smaller than that of the second circuit board. Between the first and second circuit boards is a gap. The first and second circuit boards are each distributed with multiple electronic elements, and are connected by at least one electrical connecting line. The electronic elements form a power supply circuit, in which a bridge rectification module is disposed on the first circuit board and close to the gap. The cooling fan is at least connected to the first circuit board and a second circuit board to locate in the gap, and directly provides the bridge rectification module with a first cooling air current when activated.

6 Claims, 3 Drawing Sheets

(56) References Cited

U.S. PATENT DOCUMENTS

| | | | | |
|---|---|---|---|---|
| 7,379,303 B2* | 5/2008 | Miyamura | ................ | G06F 1/18 |
| | | | | 361/715 |
| 9,448,605 B2 | 9/2016 | Shih et al. | | |
| 9,448,618 B2* | 9/2016 | Chen | .................... | G06F 1/3293 |
| 9,832,909 B2* | 11/2017 | Tanaka | ............... | H05K 7/20145 |
| 2003/0147219 A1* | 8/2003 | Chou | ................... | G11B 33/128 |
| | | | | 361/725 |
| 2004/0061992 A1* | 4/2004 | Roman | ................ | H02M 7/003 |
| | | | | 361/601 |
| 2004/0228646 A1* | 11/2004 | Sekiguchi | ............ | G03G 21/206 |
| | | | | 399/92 |
| 2005/0064810 A1* | 3/2005 | Lee | ....................... | F04D 29/601 |
| | | | | 454/184 |
| 2005/0275991 A1* | 12/2005 | Lee | ........................ | G06F 1/184 |
| | | | | 361/103 |
| 2006/0133034 A1* | 6/2006 | Lee | .................... | H05K 7/20172 |
| | | | | 361/695 |
| 2011/0128703 A1* | 6/2011 | Fujihara | .................... | G06F 1/20 |
| | | | | 361/697 |
| 2012/0293944 A1* | 11/2012 | Yi | ....................... | H05K 7/1487 |
| | | | | 361/679.32 |
| 2012/0307447 A1* | 12/2012 | Wu | .......................... | G06F 1/20 |
| | | | | 361/679.48 |
| 2015/0245537 A1* | 8/2015 | Sakuma | ................ | H01F 27/085 |
| | | | | 363/141 |
| 2015/0346808 A1* | 12/2015 | Chen | .................... | G06F 1/3293 |
| | | | | 713/2 |
| 2015/0348694 A1* | 12/2015 | Sakuma | ............ | H05K 7/20909 |
| | | | | 336/60 |

* cited by examiner

POWER SUPPLY FOR REDUNDANT POWER SYSTEM

FIELD OF THE INVENTION

The present invention relates to a power supply for a redundant power system, and particularly to a power supply in which a cooling fan is not disposed at an air vent at an end of a housing.

BACKGROUND OF THE INVENTION

In the year 1992, the United States Environmental Protection Agency (EPA) and Department of Energy (DOE) launched an Energy Star plan. The Energy Star 4.0 further defines a 80 PLUS specification for power supplies. The 80 PLUS is targeted at ensuring that a conversion efficiency of greater than 80% is provided when a power supply is not in a load level. The 80 PLUS specification, according to conversion efficiencies, can be graded into copper, silver, gold, platinum and titanium. With respect to the platinum grade, it specifies that when a power supply is in half-load and an external power is a 200V input, the conversion efficiency of the power supply needs to maintain at 94% in order to pass verification.

Referring to FIG. 1, a conventional power supply 50 completely lays out a power supply circuit 51 on a same circuit board 52, and a cooling fan 53 for dissipating heat of the circuit board 52 is placed at one end of the power supply 50, as shown in FIG. 1. However, among the modules in the power supply circuit 51, a bridge rectification module 511 has a highest power consumption, which occupies 12.3% of the total power consumption of the power supply 50. A part of the power consumption of the bridge rectification module 511 is generated due to temperature rise caused by operations. Thus, when a designer lays out components of the power supply 50, positions of other elements and the bridge rectification module 511 also need be considered to prevent large-area elements from blocking air currents for dissipating heat of the bridge rectification module 511. For example, a path of an air current is as shown by 54 in FIG. 1. However, the size of the power supply 50 is regulated (e.g., by the Advanced Technology eXtended, ATX, standard) and cannot be modified as desired, adding limitations to the layout of elements such that the power consumption of the bridge rectification module 511 cannot be effectively resolved.

SUMMARY OF THE INVENTION

It is a primary object of the present invention to solve the issue of power consumptions caused by temperature rise of a bridge rectification module of a conventional power supply.

It is another object of the present invention to solve the issue of various limitations on the layout of elements, wherein the limitations are caused during a layout process of elements of a conventional power supply structure by a heat dissipation requirement of a bridge rectification module.

To achieve the above objects, the present invention provides a power supply for a redundant power system. The power supply includes a housing, a first circuit board, a second circuit board and a cooling fan. The housing includes an accommodating space, and a first air vent and a second air vent respectively located at two sides of the accommodating space. The first circuit board and the second circuit board are sequentially disposed in the accommodating space. The length of the first circuit board is substantially smaller than the length of the second circuit board. One end of the first circuit board is located at the first air vent, and one end of the second circuit board is located at the second air vent. Between the second circuit board and the first circuit board is a gap. The first circuit board and the second circuit board are each distributed with a plurality of electronic elements, and are connected by at least one electrical connecting line there between. The electronic elements form a power supply circuit. A bridge rectification circuit in the power supply is disposed at a position on the first circuit board and close to the gap. The cooling fan is disposed in the accommodating space and is located in the gap. The cooling fan includes an air inlet facing above the second circuit board, and an air outlet facing the first circuit board and directly providing the bridge rectification module with a first cooling air current when the cooling fan is activated.

In one embodiment, the housing is a rectangular form, which has two long sides and two short sides. The gap is deviated from a center position of each of the long sides and is obliquely disposed towards the direction of the first air vent.

In one embodiment, the power supply is connected to an external power source via at least one electronic elements on the first circuit board. The second circuit board includes thereon a power connection port, which is located at the second air vent to selectively connect to a power integration backplane of the redundant power system.

In one embodiment, the cooling fan is at least connected to the first circuit board or the second circuit board to locate in the gap.

In one embodiment, the power supply has a second cooling air current, which enters via the second air vent and flows towards the gap to perform heat exchange with the electronic elements on the second circuit board when the cooling fan is activated.

With the embodiments disclosed by the present invention, the present invention provides following features compared to the prior art. In the present invention, the cooling fan is disposed in the gap between the first circuit board and the second circuit board, and the air outlet of the cooling fan is directly targeted at the bridge rectification module placed on the first circuit board. Thus, the bridge rectification circuit directly obtains the first cooling air current provided by the cooling fan to provide the bridge rectification module with better heat dissipation, so as to prevent the temperature rise of the bridge rectification module from generating excessive consumption. Further, the solution implemented by the present invention effectively solves the issue of various limitations on the layout of elements.

DETAILED DESCRIPTION OF THE PREFERRED EMBODIMENTS

Details and technical contents of the present invention are given with the accompanying drawings below.

Figure 1:
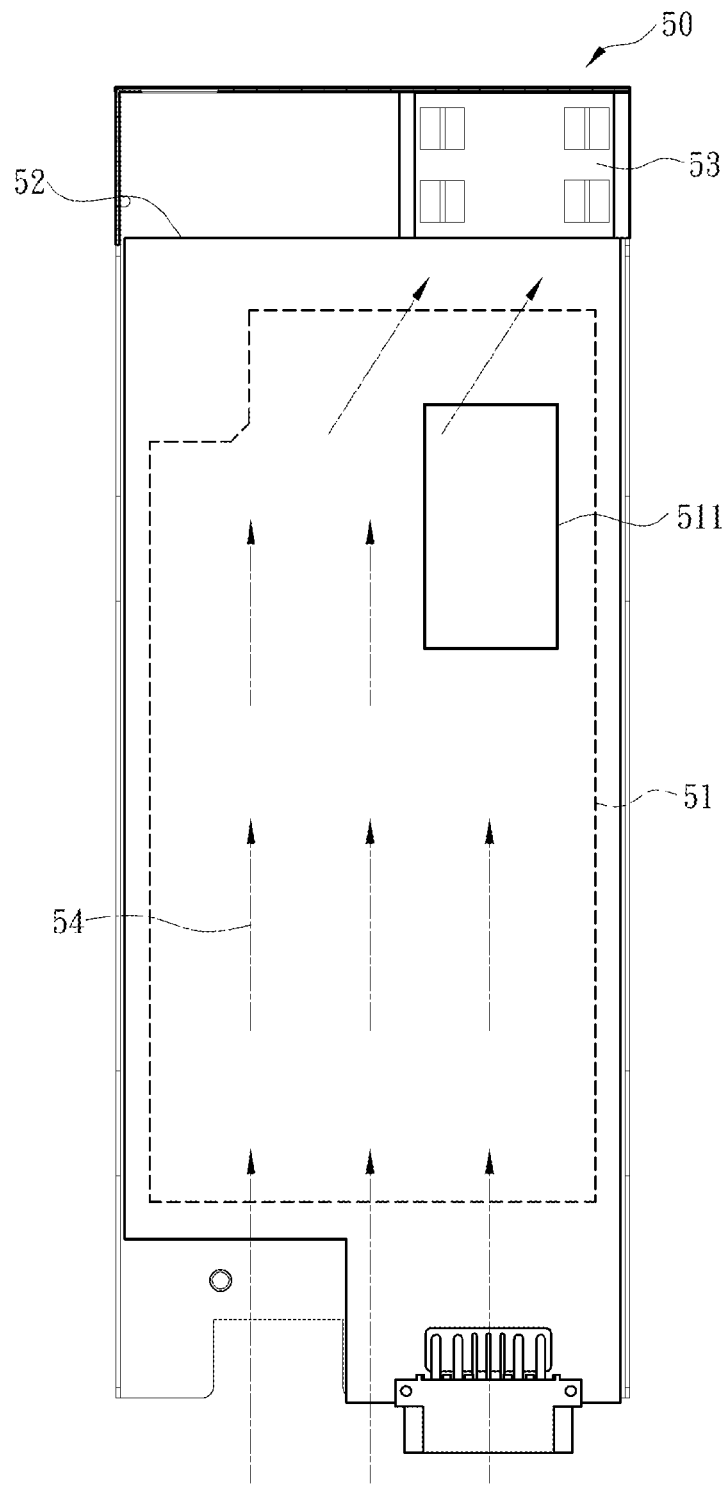
FIG. 1 is a schematic diagram of a cooling fan of a conventional power supply.
Figure 2:
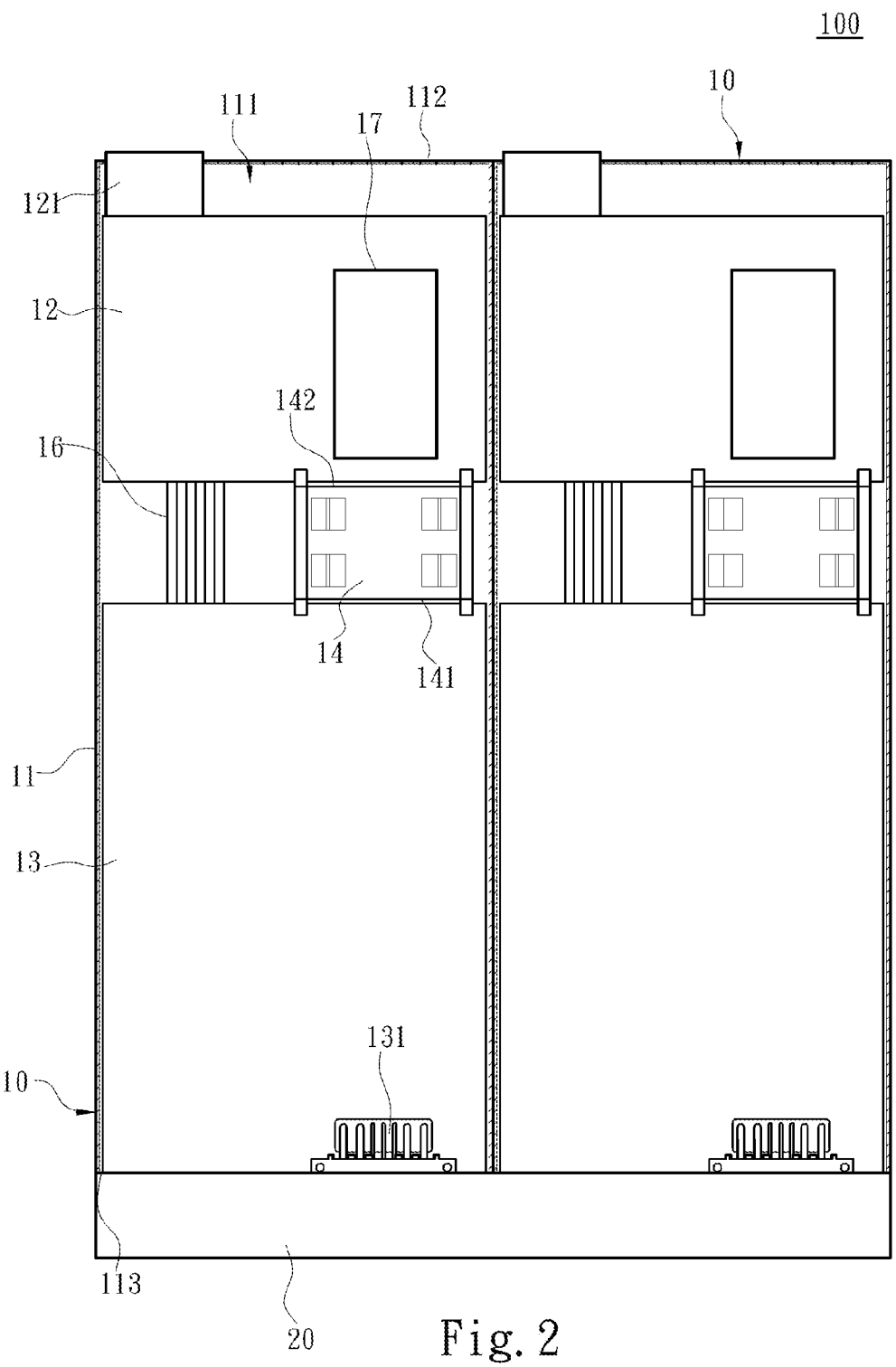
FIG. 2 is a structural schematic diagram of a redundant power system and a power supply.
Figure 3:
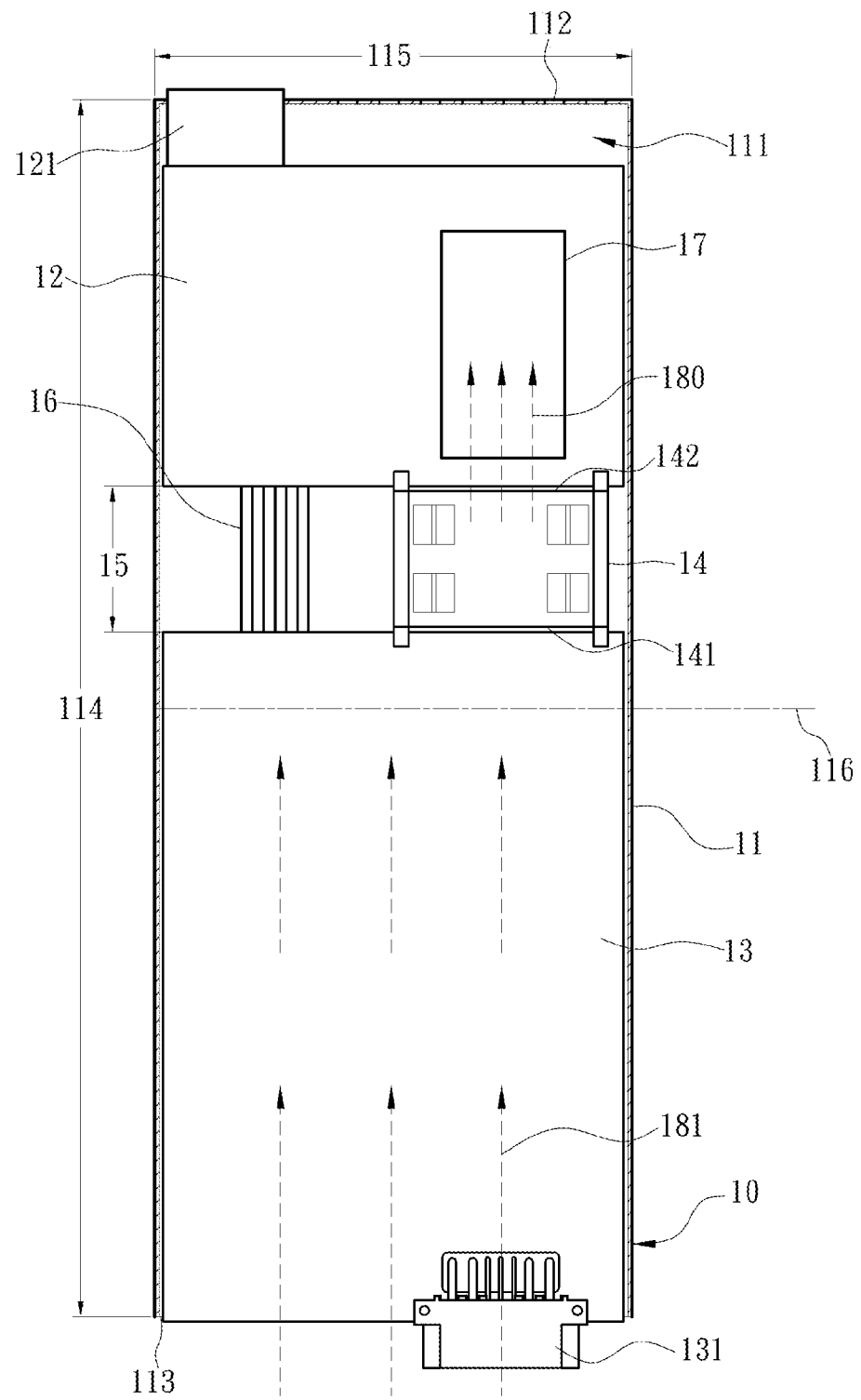
FIG. 3 is a schematic diagram of cooling air currents of a power supply of the present invention.

Referring to FIG. 2 and FIG. 3, the present invention provides a power supply 10. The power supply 10 is applied to a redundant power system 100, which is, for example, as disclosed by the U.S. Pat. No. 9,401,627, No. 9,448,605 and No. 9,448,618. The redundant power system 100 is primarily formed by M+N power supplies 10 and a power integration backplane 20, where M is greater than or equal to 1, and N is greater than or equal to 1. These power supplies 10 are connected to the power integration backplane 20. In addition to receiving power outputted from the power supplies 10, the power integration backplane 20 further outputs balance control of loads to the power supplies 10.

Each of the power supplies 10 includes a housing 11, a first circuit board 12, a second circuit board 13 and a cooling fan 14. The housing 11 may be manufactured from a plurality of plate materials by mechanical processing. The housing 11 is hollow, and includes an accommodating space 111, and a first air vent 112 and a second air vent 113 respectively located at two ends of the accommodating space 111. The first circuit board 12 and the second circuit board 13 are sequentially disposed in the accommodating space 111. The length of the first circuit board 12 is substantially smaller than the length of the second circuit board 13. One end of the first circuit board 12 is located at the first air vent 112, and one end of the second circuit board 13 is located at the second air vent 113. Although sequentially disposed, the second circuit board 13 and the first circuit board 12 are not in contact, hence forming a gap 15. More specifically, the housing 11 of the present invention is in a rectangular form, which has two long sides 114 and two short sides 115. Each of the long sides 114 has a center position 116. In the present invention, due to different lengths of the first circuit board 12 and the second circuit board 13, the gap 15 deviates from the center positions 116 of the long sides 114, and is disposed obliquely towards the direction of the first air vent 112.

Each of the first circuit board 12 and the second circuit board 13 is distributed with a plurality of electronic elements (not shown). The first circuit board 12 and the second circuit board 13 are connected by at least one electrical connecting line 16, which provides the first circuit board 12 and the second circuit board 13 with an electrical connection. Further, the electronic elements distributed on the first circuit board 12 and the second circuit board 13 form a power supply circuit, which includes at least one bridge rectification module 17, a power factor adjustment module and a voltage adjustment module. The bridge rectification module 17 is disposed at a position on the first circuit board 12 and close to the gap 15, as shown in FIG. 3. Further, the power supply 10 is connected to an external power source via at least one of the electronic elements on the first circuit board 12. For example, the electronic element may be a plug 121. The second circuit board 13 includes a power connection portion 131, which is located at the second air vent 113 to selectively connect to the power integration backplane 20 of the redundant power system 100.

Again referring to FIG. 3, the cooling fan 14 is disposed in the accommodating space 111 and is located in the gap 15. More specifically, the cooling fan 14 may be installed in the accommodating space 111 by different methods according to different assembly processes and housing structural designs. In one embodiment, the cooling fan 14 is at least connected to the first circuit board 12 or the second circuit board 13 and locates in the gap 15. Further, the cooling fan 14 may also be directly installed on the housing 11. The cooling fan 14 includes an air inlet 141 facing above the second circuit board 13, and an air outlet 142 facing the bridge rectification module 17 on the first circuit board 12.

Referring to FIG. 3, when the power supply 10 of the present invention is activated, the cooling fan 14 is also activated. At this point, the air outlet 142 directly faces the bridge rectification module 17, such that the bridge rectification module 17 receives a first cooling air current 180 from the air outlet 142 when the cooling fan 14 is activated. The first cooling air current 180 dissipates heat of the bridge rectification module 17 to prevent the bridge rectification module 17 from generating excessive consumption due to temperature rise. Thus, once the consumption of the bridge rectification module 17 stays in control, the consumption of each of the power supplies 10 can be further reduced, which is beneficial for enhancing the efficiency of the power supplies 10. In addition to the above effect, the power supply 10 of the present invention further has a second cooling air current 181, which enters via the second air vent 113 and flows towards the gap 15 to perform heat exchange with the electronic elements on the second circuit board 13 when the cooling fan 14 is activated. That is to say, when the cooling fan 14 is activated, air in the accommodating space 111 is caused to flow, and external air is injected into the accommodating space 111 via the second air vent 113. The injected external air forms the second cooling air current 181 that dissipates heat of the electronic elements distributed on the second circuit board 13.

With the implementation of the above embodiments of the present invention, a designer is not required to consider during design process whether positions of electronic elements distributed on a circuit board obstruct a cooling air current, thus simplifying a circuit layout.

What is claimed is:

1. A power supply for a redundant power system, comprising:
    a housing, having an accommodating space, and a first air vent and a second air vent respectively located at two ends of the accommodating space;
    a first circuit board and a second circuit board, sequentially disposed in the accommodating space, a length of the first circuit board being substantially smaller than a length of the second circuit board, one end of the first circuit board located at the first air vent, one end of the second circuit board located at the second air vent, between the second circuit board and the first circuit board being a gap, the first circuit board and the second circuit board being each distributed with a plurality of electronic elements and being connected by at least one electrical connecting line in between, the plurality of electronic elements forming a power supply circuit; wherein, a bridge rectification module in the power supply circuit is disposed at a position on the first circuit board and close to the gap; and
    a cooling fan, disposed in the accommodating space and located in the gap, including an air inlet facing above the second circuit board and an air outlet facing the first circuit board and directly providing the bridge rectification module with a first cooling air current when the cooling fan is activated.

2. The power supply for a redundant power system of claim 1, wherein the housing is in a rectangular form, the rectangular form include two long sides and two short sides, and the gap deviates from a center position of each of the long sides and is obliquely disposed towards a direction of the first air vent.

3. The power supply for a redundant power system of claim 2, wherein the power supply is connected to an external power source via at least one of the plurality of electronic elements on the first circuit board, and the second circuit board comprises an electrical connection port, which is located at the second air vent to selectively connect to a power integration backplane of the redundant power system.

4. The power supply for a redundant power system of claim 3, wherein the cooling fan is at least connected to the first circuit board or the second circuit board to locate in the gap.

5. The power supply for a redundant power system of claim 2, including a second cooling air current, which enters via the second air vent and flows towards the gap to perform heat exchange with the plurality of electronic elements on the second circuit board when the cooling fan is activated.

6. The power supply for a redundant power system of claim 1, wherein the cooling fan is at least connected to the first circuit board or the second circuit board to locate in the gap.

* * * * *